Sept. 30, 1958     G. W. WALLACE     2,853,744
SILO STRUCTURE
Filed Sept. 27, 1954     2 Sheets-Sheet 1
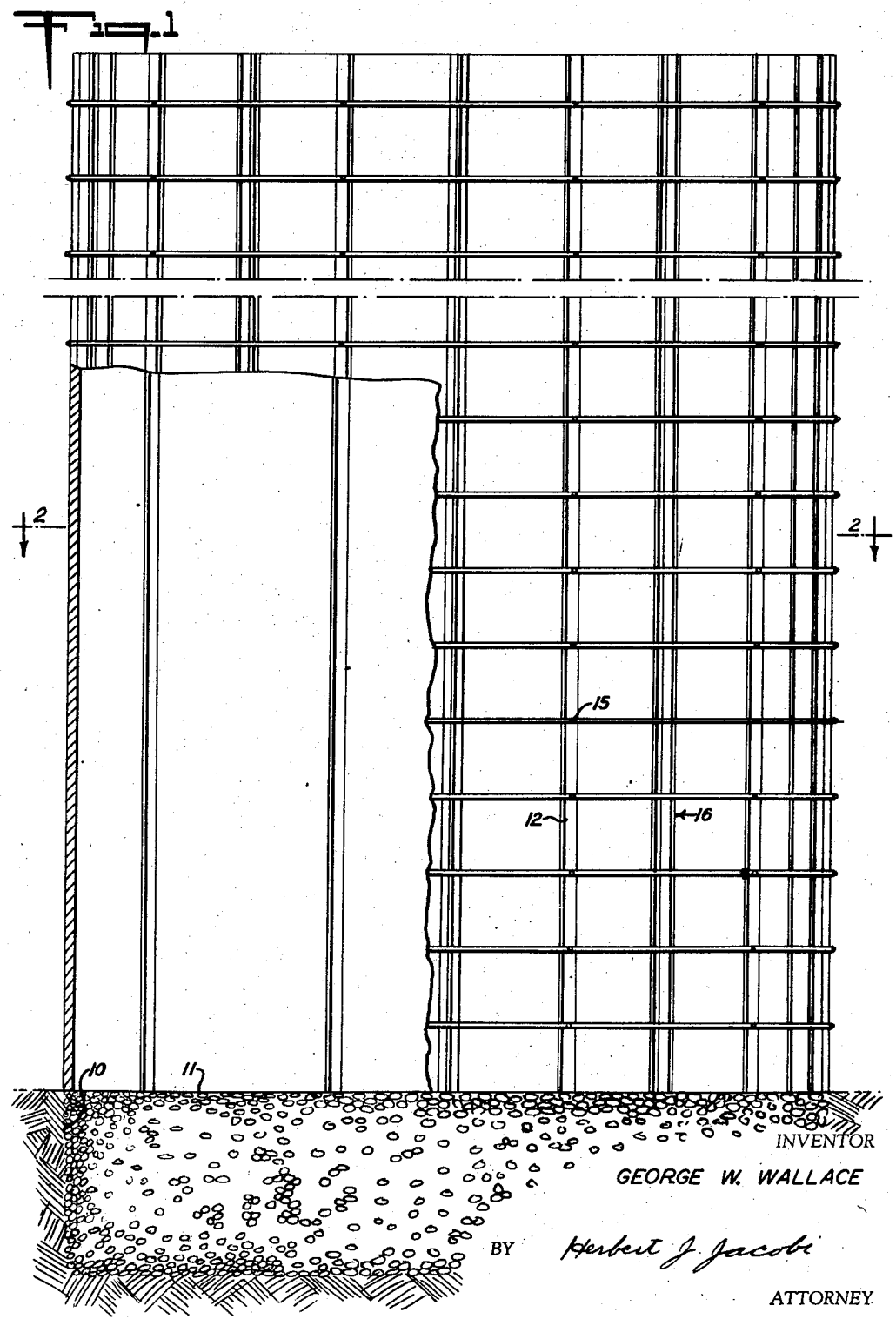
INVENTOR
GEORGE W. WALLACE
BY Herbert J. Jacobi
ATTORNEY

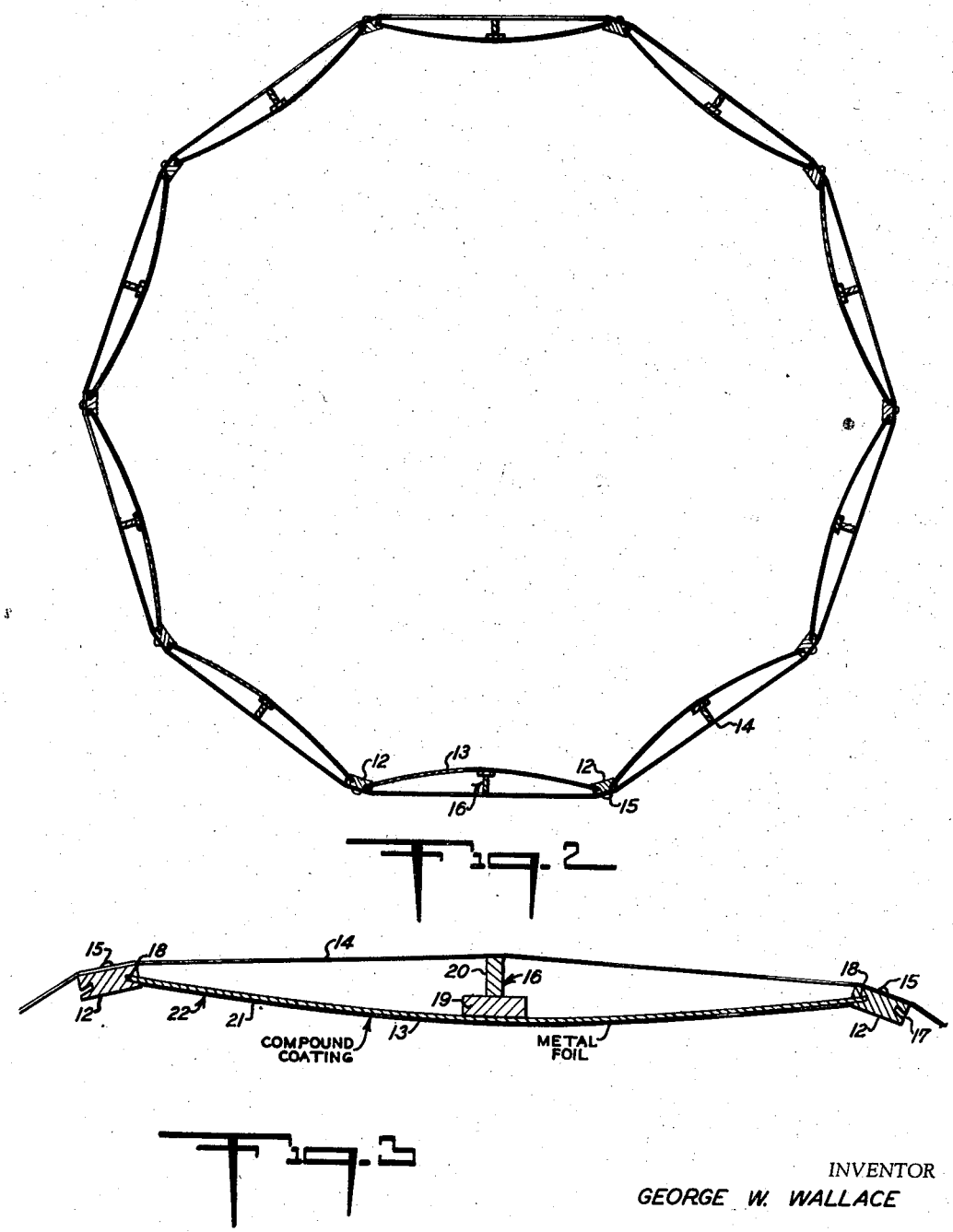

United States Patent Office 2,853,744
Patented Sept. 30, 1958

2,853,744

SILO STRUCTURE

George W. Wallace, Waynesboro, Pa.

Application September 27, 1954, Serial No. 458,389

3 Claims. (Cl. 20—1.4)

This invention relates to storage containers and more particularly to a silo structure intended for the storage of fluent materials such as ensilage, grain and the like.

Heretofore, it has been customary to construct silos of masonry, wood, tile or bricks and these prior art structures have been relatively heavy requiring an expensive and heavy foundation as well as requiring extremely careful construction in order to provide a true vertical structure and one which will withstand the elements such as relatively high wind pressures. These prior art structures have normally been held together by a plurality of vertically spaced hoops, each of which is individually tensioned by means of turnbuckles or the like, to exert an inward force on the structure and this has required extremely careful adjustment of each hoop in order to provide a truly vertical structure and to prevent collapse of sections of such structure. Furthermore, expansion and contraction of the hoops and the materials used in prior art silo construction has resulted in a variation in strength of the structure which materially changes the degree of deformation thereof, due to the outward force exerted by the material stored therein and in many instances, this deformation has been sufficient to result in severe damage, if not complete destruction of the silo structure.

As will be readily understood, these prior art silo structures have required a relatively long period of time to erect and consequently, the cost thereof has been extremely high and in many instances, prohibitive. No small part of the relatively high cost of prior art silo structures has been the necessity for providing a relatively massive and deeply imbedded foundation and furthermore, it was necessary to locate these structures on extremely firm relatively dry earth. Another feature materially contributing to the relatively high cost of prior art silo structures, was the necessity for employing relatively highly skilled labor in the erection thereof, skilled masons being required for laying bricks or tile, or for making a concrete structure and skilled carpenters or other artesans being required for erecting a wooden structure and properly adjusting the hoops utilized to maintain the same in erected condition, and provide sufficient strength to withstand the outward forces exerted by the materials stored therein. It will therefore, be seen that any lightweight, inexpensive silo structure which will serve to adequately store the material, such as ensilage, grain and the like, therein without undue distortion or damage due to the outward pressures exerted thereby and also without deterioration caused by fluids of high acid content, resulting from fermentation and the like, of the stored materials, represents a very worthwhile step forward in the art.

It is accordingly an object of this invention to provide a silo structure of relatively lightweight design and which may be erected by relatively unskilled labor in a minimum of time of the order of two and one-half hours.

A further object of the invention is the provision of a silo structure of relatively simple design and in which the resistance to deformation due to the outward pressure exerted by the material stored therein, increases as the outward pressure increases.

A still further object of the invention is the provision of a silo structure designed to yield in accordance with the outward pressure exerted thereon by the materials stored therein the resistance to such yielding increasing as the outward pressure increases and serving to provide a completely fluid-tight structure.

Another object of the invention is the provision of a silo structure which may be assembled from relatively inexpensive plywood panels, the entire structure being held in erected condition by straps or bands extending therearound, such bands resisting the entire outward force exerted by the materials stored in the silo, the tension in each band automatically compensating for the load exerted thereagainst, thereby precluding the necessity for individually and accurately tensioning each band during erection of the silo.

A further object of the invention is the provision of a relatively lightweight economical silo structure which readily lends itself to the provision of heat insulation and also to protection against deterioration, by reason of the acid content of the materials stored therein.

Another object of the invention is the provision of a relatively lightweight, inexpensive silo structure in which all of the components thereof may be shipped to the erection site in a packaged, knocked-down condition, and subsequently, rapidly and economically erected by relatively unskilled labor, thereby maintaining the cost of such silo at a minimum.

Further objects and advantages of the invention will be apparent from the following description taken in conjunction with the accompanying drawing wherein:

Fig. 1 is a side elevational view with parts broken away and in section for greater clarity and showing a silo constructed in accordance with this invention and also the foundation required for supporting the same;

Fig. 2, a transverse sectional view on the line 2—2 of Fig. 1; and

Fig. 3, a fragmentary sectional view to an enlarged scale and showing the truss structure formed by the vertical ribs, panel, strap and spacing blocks.

With continued reference to the drawing, there is shown a silo structure which may be erected on a relatively simple and economical foundation comprising a relatively shallow hole 10 in the earth which may be filled with crushed or chipped stone 11, this foundation providing an adequate support for the silo structure and contents thereof and, at the same time, providing adequate drainage for any fluids present in the material stored in the silo.

The silo structure of this invention is generally of polygonal formation in cross-section and may well comprise a plurality of spaced, vertically disposed ribs 12 which may be formed of wood or other suitable material, these ribs being continuous and extending from the top to the bottom of the silo. The space between adjacent pairs of ribs 12 is filled by a panel 13 of exterior grade or marine plywood or other suitable material and this panel likewise, extends continuously from the top to the bottom of the silo. The panels 13 and ribs 12 are held in assembled relationship by a plurality of vertically spaced bands or straps 14 of metal or other suitable material, these straps 14 extending entirely around the silo and being secured to each rib 12 by nails or other suitable fastening means 15. Midway between each pair of adjacent ribs 12, a spacer block 16 is disposed between the strap 14 and the panel 13 and the purpose of such spacer blocks 16 will be presently described.

With particular reference to Fig. 3, there is shown to a greatly enlarged scale the construction and relative positions of the ribs 12, panel 13, strap 14 and spacer block 16. As will be seen from an inspection of this figure, each rib 12 is provided with a groove 17 in opposite side edges thereof. These grooves 17 extending throughout the length of each rib 12. These grooves 17 are disposed at an angle or are inclined with respect to the plane of each rib 12 and the grooves 17 serve to slidably receive the opposite side edges 18 of the panel 13. Of course, the width of the groove 17 will be such as to firmly engage the sides of the panel 13 adjacent the edges 18 thereof.

As shown, the strap or band 14 extends around the outer sides of the ribs 12 and is secured to each rib against movement relative thereto, by the nails or other suitable fastening means 15 and the spacer block 16 disposed between the strap 14 and the outer surface of the panel 13 is of such dimensions as to bow the panel 13 inwardly as clearly shown in Fig. 3, this bending of the panel 13, of course, being within the elastic limit thereof. The curvature of the panel 13 is not particularly critical and during the erection of the silo, the strap 14 is tensioned between each pair of ribs 12, a sufficient amount to bow or bend the panel 13 inwardly, until the strap 14 extending between adjacent ribs 12 approaches a straight line. The spacer block 16 may be a single piece of material extending from top to bottom of the silo or may constitute an individual block between each strap 14 and the panel 13. Likewise, the block 16 may be formed from a single piece of material or may be formed, as shown in Fig. 3, by a relatively wide base portion 19, engaging the panel 13 and a relatively narrow spacer portion 20 engaging the strap 14.

If desired, the inner surface of each panel 13 may be covered with metallic foil 21, such as aluminum, to provide heat insulating means, but, if desired, or not necessary, such foil may be omitted. Likewise, the foil 21, if present, or the inner surface of each panel 13, if foil is not utilized, may also be coated with a suitable material 22 which may, if desired, be a compound of tar and rubber, which is both acid-resistant and water-resistant. Since the materials, such as ensilage and grain frequently stored in such silos, tend to ferment and produce fluids having a relatively high acid content, this coating is extremely desirable in order to prevent deterioration of the wood surfaces in contact therewith.

The silo of this invention may be conveniently packaged and shipped in knock-down condition to the erection site, the parts making up the entire silo being merely the ribs 12, the panels 13, the straps 14 and the spacer blocks 16, as well as suitable fastening means 15 for securing the straps 14 to the ribs 12. Upon arriving at the erection site, the silo may be conveniently erected by inserting the edges 18 of the panels 13 in the grooves 17 in ribs 12, and by stretching the straps 14 between each adjacent pair of ribs 12 with the spacer blocks 16 disposed between the straps 14 and the panels 13 at substantially the midpoint thereof. The straps 14 are secured to each rib 12 by the fastening means 15 progressively, and as stated above, it is only necessary to tension the strap 14 between each pair of adjacent ribs 12 sufficiently to bow or bend the panel 13 inwardly until the strap 14 approaches a straight line between adjacent ribs.

It has been found that by experience, that a silo constructed in accordance with this invention and which silo is normally from ten to fifteen feet in height, may be conveniently and economically erected in a period of time of the order of two and one-half hours. The resulting structure is relatively light, and yet due to the relatively low height thereof, possesses sufficient resistance to the elements, such as wind pressure, and only requires a loose stone-ship base, as described above, which in addition to supporting the same provides adequate drainage.

As the silo is filled with material such as ensilage or grain, which, of course, is fluent and which exerts an increasingly greater outward force on the side wall of the silo as such material builds up therein, it will be obvious that such outward force will tend to urge or deform the inwardly bowed panels 13 outwardly, which, of course, will tend to increase the tension in the straps 14, and since a truss is formed between each adjacent pair of ribs 12, the resistance to outward movement of panels 13 will increase as the outward pressure thereon increases. Consequently, equilibrium is reached for each condition of loading, and the overall strength of the silo structure increases as the loading thereof increases. Furthermore, due to the outward movement of the panels 13, under loaded conditions, it will be seen that the side edges 18 thereof, tend to move apart and such movement will bring these side edges into firm engagement with the bottoms of the grooves 17 of the ribs 12, thus resulting in a completely fluid-type joint between the panels 13 and the ribs 12. By this structure there is therefore provided a silo in which all leakage of fluids through the sidewalls thereof is prevented and any fluids present in the materials stored within the silo will drain downwardly and into the porous foundation formed by the crushed or chipped stone 11.

It will thus be seen, that there has been provided by the above invention, a lightweight, extremely strong and yet highly economical silo structure, which may be conveniently and rapidly erected in a minimum of time by relatively unskilled labor, and one which may be packaged and shipped in knock-down condition to the erection site. Furthermore, the silo of this invention automatically compensates for increases in load caused by the material stored therein, the strength of the silo increasing as the load increases, which results in providing adequate strength without the necessity of relatively massive construction. Furthermore, the construction of the silo of this invention precludes the necessity for careful or accurate tensioning of hoops or straps as has been necessitated by prior silo constructions, and this materially contributes to the relatively low cost of this silo. All of the materials utilized in the construction of the silo of this invention are readily available and easily formed and worked, and as a result, such silos are available and usable where heretofore, the use of silos was prohibited by the relatively high cost thereof.

It will be obvious to those skilled in the art that various changes may be made in the invention without departing from the spirit and scope thereof and therefore, the invention is not limited by that which is shown in the drawing and described in the specification, but only as indicated in the appended claims.

What is claimed is:

1. Silo structure of polygonal form in cross-section comprising a plurality of spaced, vertically disposed ribs arranged in a circle substantially equal to the diameter of said silo, each rib being continuous and extending from top to bottom of said silo, a groove in each opposite side edge of each rib and extending throughout the length thereof, a plywood panel extending between each pair of adjacent ribs with the opposite side edges of said panel disposed in the opposed grooves of said pair of adjacent ribs, a plurality of vertically spaced, flexible straps extending completely around said silo and secured to each rib against movement relative thereto, a spacer block between each strap and each panel adjacent the vertical center line thereof, said blocks being of such dimensions as to bow each panel inwardly within the elastic limit of the same, the strap between adjacent ribs and the associated block forming a truss, whereby the outward pressure exerted by ensilage within the silo will tend to straighten said panels forcing the vertical edges thereof into fluid-tight engagement with the bottoms of said grooves and, at the same time, increase the tension in the straps, the resistance to outward movement of said panels increasing proportionately as outward pressure thereon increases.

2. Silo structure comprising a plurality of spaced vertically disposed ribs arranged in a circle substantially equal to the diameter of said silo, each rib extending from top to bottom of said silo, a groove in each opposite side edge of each rib and extending throughout the length thereof, a plywood panel extending between each pair of adjacent ribs with the opposite side edges of said panel disposed in the opposed grooves of said pair of adjacent ribs, a plurality of vertically spaced, flexible straps extending completely around said silo and secured to each rib against movement relative thereto, and a spacer block between each strap and each panel adjacent the vertical center line thereof, said blocks being of such dimensions as to bow each panel inwardly within the elastic limit of the same, the strap between adjacent ribs and the associated block forming a truss whereby, upon introducing a fluent material into said silo, the outward pressure exerted thereby will tend to straighten said panels forcing the vertical edges thereof into fluid-tight engagement with the bottoms of said grooves and, at the same time, increase the tension in the straps, the resistance to outward movement of said panel increasing as outward pressure thereon increases.

3. Silo structure comprising a plurality of spaced, vertically disposed ribs, a groove in each opposite side edge of each rib, a panel extending between each pair of adjacent ribs with the opposite side edges of said panel disposed in the opposed grooves of said pair of adjacent ribs, a plurality of vertically spaced, flexible straps extending completely around said silo and secured to each rib against movement relative thereto and a spacer block between each strap and each panel adjacent the vertical center line thereof, said blocks being of such dimensions as to bow each panel inwardly within the elastic limit of the same, the strap between adjacent ribs and the associated block forming a truss whereby, upon introducing fluent material into said silo, the outward pressure exerted thereby will tend to straighten said panels forcing the vertical edges thereof into fluid-tight engagement with the bottoms of said grooves and, at the same time, increase the tension in the straps, the resistance to outward movement of said panels increasing as outward pressure thereon increases.

References Cited in the file of this patent
UNITED STATES PATENTS

| | | |
|---|---|---|
| 741,403 | Hubbard | Oct. 13, 1903 |
| 1,301,624 | Van Cott | Apr. 22, 1919 |
| 1,381,693 | Bauerle | June 14, 1921 |
| 1,491,328 | Albin | Apr. 22, 1924 |
| 2,030,668 | Weyerhaeuser et al. | Feb. 11, 1936 |
| 2,365,891 | McLaughlin | Dec. 26, 1944 |
| 2,638,871 | Reudemann | May 19, 1953 |

OTHER REFERENCES

The Open Door Silo Vesper Wood Mfg. Co., Vesper, Wis., 1912, page 59.